Figure 1:
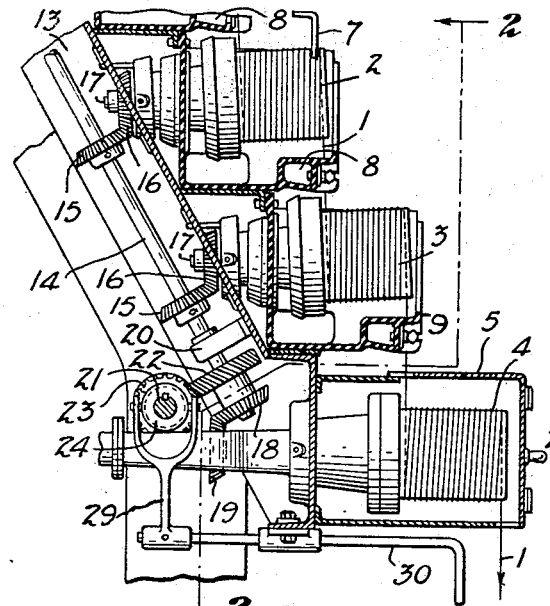

Oct. 15, 1940.   G. P. TORRENCE ET AL   2,217,717
REEL CLUTCH MECHANISM
Filed Dec. 27, 1938   3 Sheets-Sheet 1

Inventors
GEORGE P. TORRENCE
RICHARD F. BERGMANN
CLARENCE C. WALTERS
By Charles P. Herrstrom
Attorney

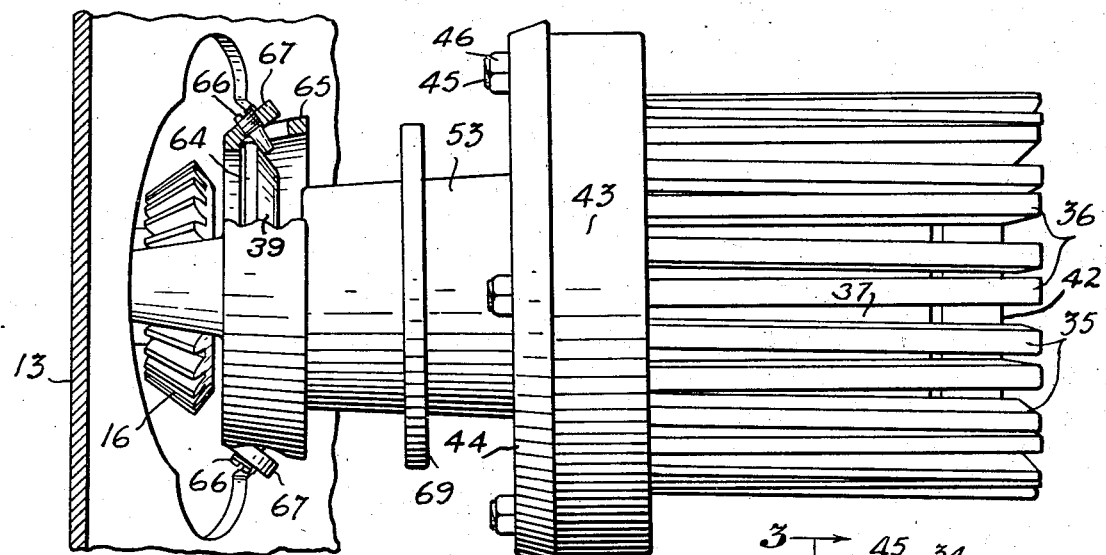
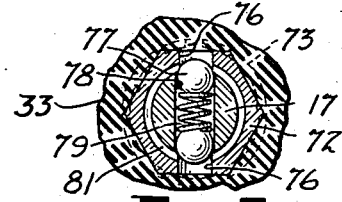
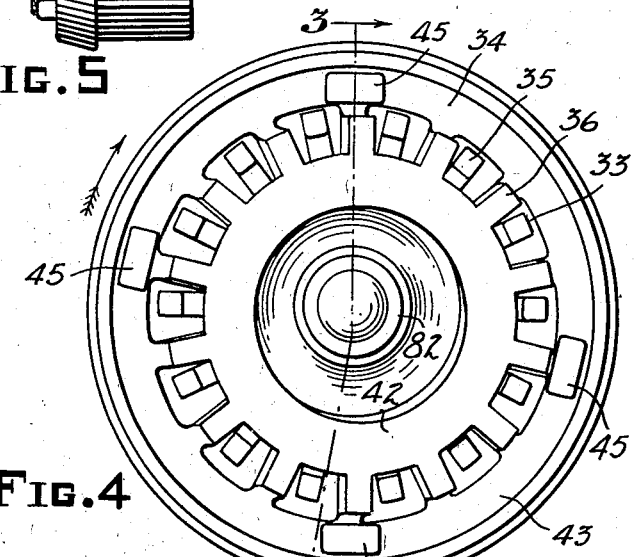
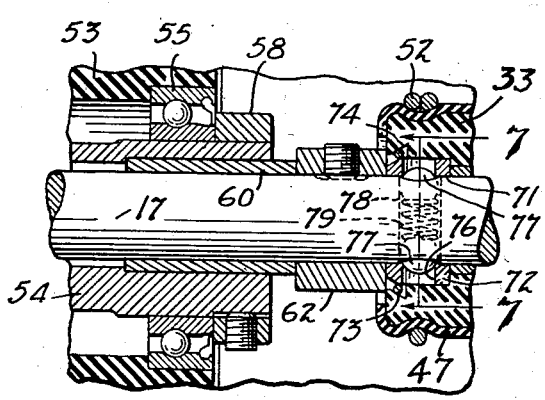
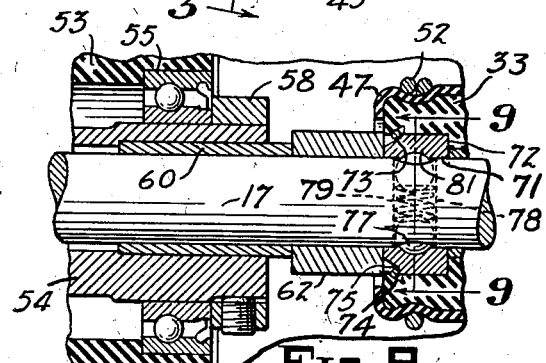

Oct. 15, 1940.  G. P. TORRENCE ET AL  2,217,717
REEL CLUTCH MECHANISM
Filed Dec. 27, 1938  3 Sheets—Sheet 3

Inventors
GEORGE P. TORRENCE
RICHARD F. BERGMANN
CLARENCE C. WALTERS

Charles E. Herrstrom
Attorney

Patented Oct. 15, 1940

2,217,717

UNITED STATES PATENT OFFICE 2,217,717

REEL CLUTCH MECHANISM

George P. Torrence, Shaker Heights, Richard F. Bergmann, Lakewood, and Clarence C. Walters, Cleveland, Ohio, assignors to Industrial Rayon Corporation, Cleveland, Ohio, a corporation of Delaware Application December 27, 1938, Serial No. 247,801

22 Claims. (Cl. 242—53)

The present invention relates to devices for advancing strip material longitudinally thereof in a plurality of spaced, generally helical turns.

The invention provides devices of this type which, by virtue of certain improved features of construction, operate without attention for long periods of time without breakage of parts. More particularly, the invention provides means permitting a device of this type to slip with respect to its driving means when the torque tending to rotate one of said elements with respect to the other becomes greater than a predetermined amount; in other words, when a predetermined torque differential occurs as between the device and its driving means. Numerous difficulties arising out of excessive torque which would otherwise result in breakage of the device, with consequent necessity for replacement of the device, of its parts or of the associated mechanism, are thereby eliminated.

While the devices of the present invention may be employed for various purposes, they may be used to particular advantage in the continuous processing of thread or the like, hereinafter referred to as "thread."

Because of constructional and operating advantages, it has been found desirable to construct apparatus for the continuous processing of thread so that each machine embodies a large number of thread processing units each of which is made up of one or more thread-advancing devices for continuously but temporarily storing the thread in a plurality of generally helical turns. In such apparatus, and particularly in apparatus for the continuous processing of artificial silk thread, it is desirable to rotate all thread-advancing devices in timed relation, this with a view to imparting identical corresponding processing treatments to all of the threads processed on the same machine. For this reason, and also because of advantages in construction, the thread-advancing devices for a large number of units are driven from common driving means such, for example, as a common drive shaft.

In order to halt the thread-advancing devices for cleaning, repair or replacement, it is necessary to provide clutch means for disconnecting the thread-advancing devices of each processing unit from the common driving means, this so that such unit can be shut down without halting the operation of the rest of the machine. To make certain that, when operating, each of the devices rotates in timed relation to all other devices in the machine, it is desirable to employ positive clutches, such as jaw clutches, to engage the individual devices with the common driving means. When such a clutch is engaged, the devices driven by it are put into rotation at a high speed practically instantly while when such a clutch is disengaged the devices are rapidly brought to a stop.

Because of the high inertia forces induced by this rapid acceleration or deceleration of the devices, breakage of such devices, of the parts thereof, or of the associated mechanism occurs frequently.

Such difficulties are particularly troublesome if the thread-advancing devices take the form of reels comprising two sets of interdigitating bar members in which one set of bar members is positively rotated by the driving means and the other set, the bar members of which are disposed alternately to those of the first set, is driven from the first set. In such reels, particularly if they are made of synthetic resins or other materials resistant to the action of the processing reagents, the possibilities of damage arising out of the practically instantaneous starting or stopping of the reels upon engagement or disengagement of a positive engagement clutch are very serious indeed.

It has been found, for example, that in reels of the conventional type breakage of the bar members or of other parts of the reel members frequently occurs when the reels are started by engagement of the clutch, due to the impact of the driving reel member upon the driven reel member. Similarly, it has been found that when the clutch is disengaged, the resulting rapid stopping of the reels causes breakage of the bar members or other parts due to the fact that the driven reel members strike against the driving reel members. These difficulties, whether arising out of impact on starting or stopping of the reel, are aggravated if either of the reel members, and particularly the reel member driven by contact with the other reel members, is mounted on antifriction bearings. Under such conditions, there is little, if any, friction drag to retard the driven reel member and reduce the impact when it strikes the driving reel member.

Jamming of the reel, which can result from various causes, also causes breakage of the reel or of associated mechanism, due to the fact that even though the drive mechanism is rotating the reel itself is halted. Experience has taught that in a plant for the manufacture of viscose artificial silk thread by a continuous process, it is impossible to keep a close watch on all of the reels at all times, due to the fact that to do so a wholly disproportionate amount of labor would be required. Consequently, if for any reason reels of the conventional type were to jam, as by entangling of the thread around certain of the parts thereof, breakage of the reel or of the associated mechanism would result.

The present invention provides means which makes it possible to drive the reels positively but in a manner permitting slippage between each reel and its driving means when the torque differential exceeds a predetermined amount, as, for example, as a result of rapid acceleration or deceleration, jamming of the reel, etc. Consequently, the above-mentioned difficulties are avoided, in addition to which other advantages are provided. Thus the invention makes it possible, merely by grasping the reel, to halt a single reel for inspection, cleaning, etc., without halting the rest of the apparatus. Furthermore, it makes for greater safety for the operators, since the reel will halt at once if the operators' fingers or clothes become caught in it.

The invention may be employed in thread-advancing reels generally, but to especial advantage in thread-advancing reels operating on the principle of that shown, described and claimed in copending application Serial No. 652,089 for "Winding reel," filed January 16, 1933, by Walter F. Knebusch. For the purposes of illustration, the invention will be described in connection with reels of the latter type. For convenience but in no sense of limitation, the reels will be shown as employed in the manufacture of viscose artificial silk thread on apparatus generally similar to that disclosed in copending application Serial No. 7,114 for "Manufacture of artificial silk," filed February 18, 1935, by Walter F. Knebusch and Alden H. Burkholder.

Figure 2:
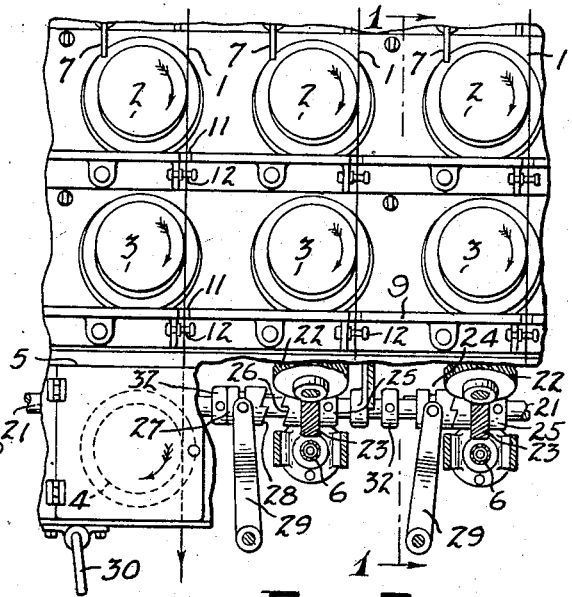
Figure 3:
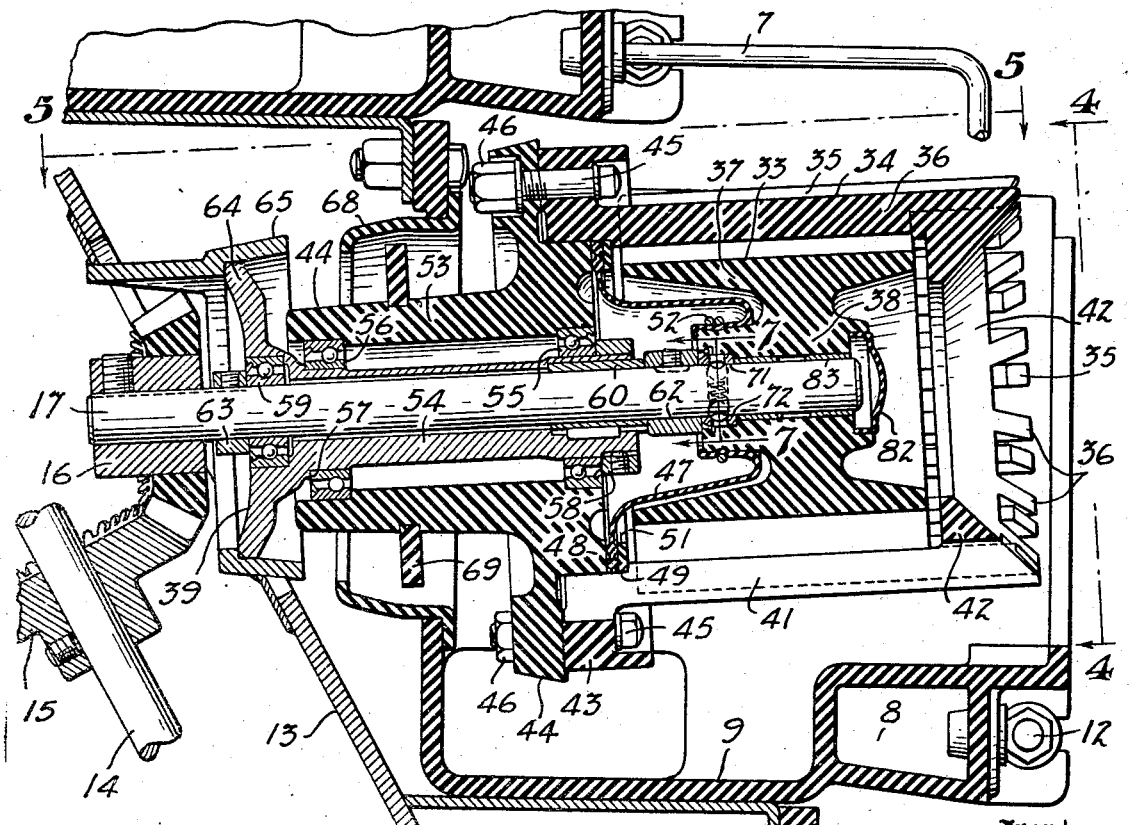

In the drawings, in which are shown several different embodiments of the invention, Figure 1 is a sectional elevation along line 1—1 of Figure 2 of a portion of a machine for the manufacture of artificial silk thread employing reels embodying the features of the present invention. Figure 2 is a front elevation of the same apparatus, some of the parts being broken away generally along line 2—2 of Figure 1. Figure 3 is a sectional elevation on an enlarged scale through a reel embodying the present invention, the section through the reel itself corresponding to line 3—3 of Figure 4. Figure 4 is an end elevation on the same scale from line 4—4 of Figure 3. Figure 5 is a plan on the same scale from line 5—5 of Figure 3, the collecting trough and associated apparatus being omitted for the sake of clearness.

Figure 6 is a portion of the reel of Figure 3 showing on an enlarged scale the slip clutch mechanism embodied in such reel. Figure 7 is a sectional elevation on the same scale as Figure 6 of a portion of the reel as seen from lines 7—7 of Figures 3 and 6. Figure 8 is an elevation similar to and on the same scale as Figure 6 showing the same parts but with the reel member turned 90° and in slipping relation to the drive shaft. Figure 9 is a sectional elevation of a portion of the reel on the same scale as and from line 9—9 of Figure 8.

Figure 10:
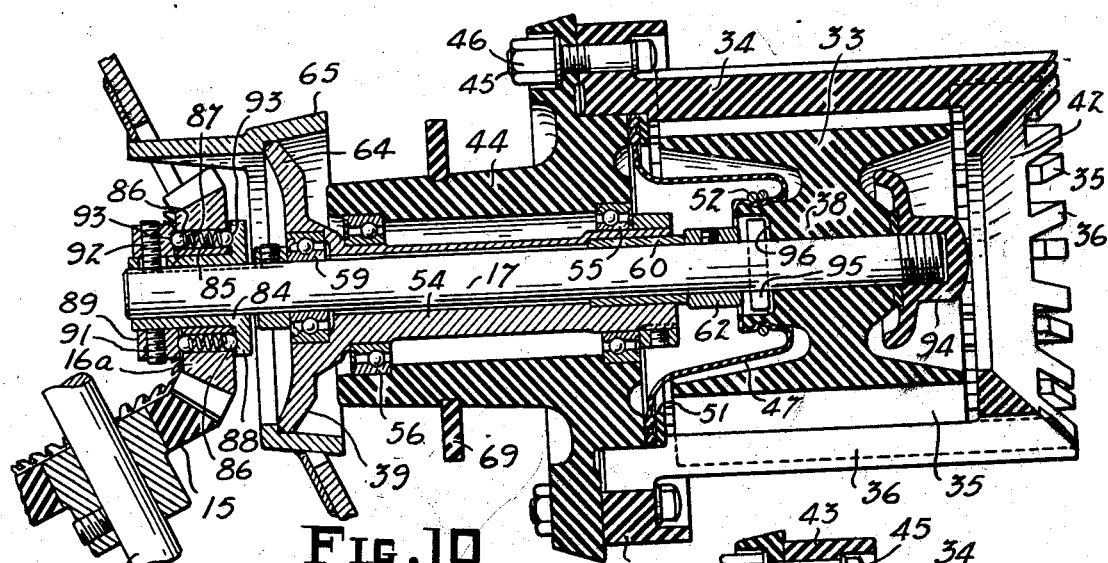
Figures 11, 14:
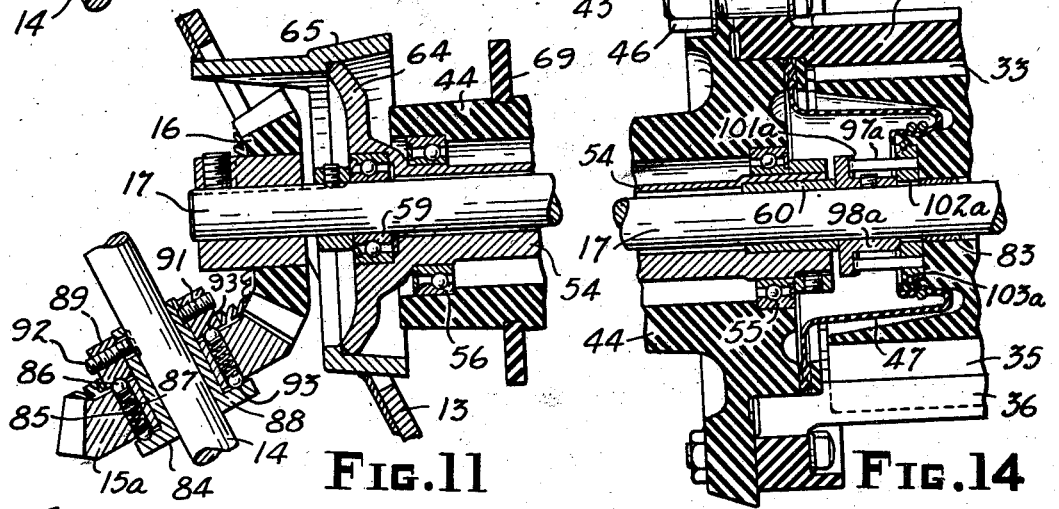
Figure 12:
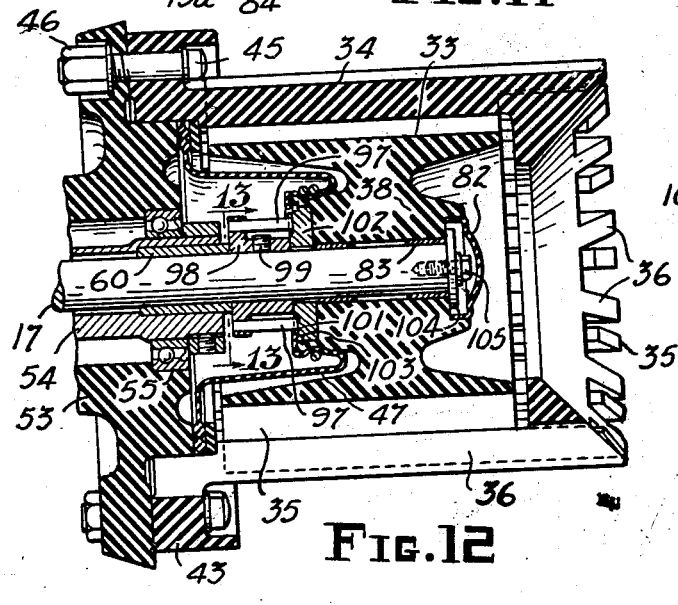
Figure 13:
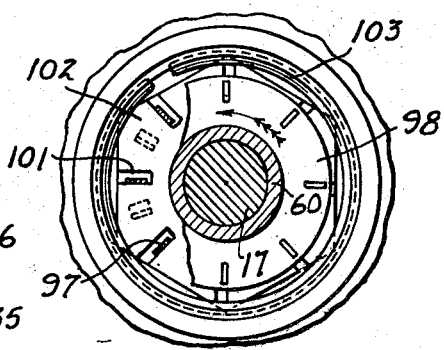

Figure 10 is a sectional elevation of another reel embodying the invention, the elevation in general corresponding to and being on the same scale as that of Figure 3. Figure 11 is a sectional elevation on the same scale of a portion of a reel in which is incorporated still another embodiment of the invention. Figure 12 is a sectional elevation of a portion of a reel constituting another embodiment of the invention corresponding generally to Figure 3 and on the same scale. Figure 13 is a sectional elevation from line 13—13 of Figure 12 showing a portion of the apparatus of said figure on an enlarged scale. Figure 14 is a fragmentary sectional elevation of another embodiment of the invention generally similar to and on the same scale as Figure 3.

In the drawings, like reference characters refer to like parts throughout.

In the apparatus illustrated in Figures 1 and 2, thread 1 from a suitable source such as thread-forming means (not shown) is passed in sequence to each of a plurality of thread-advancing reels 2, 3 and 4, on each of which the thread is subjected to a processing operation. The spacing of the thread turns shown on said reels is, of course, much greater than that employed in practice. On reel 2 the thread is subjected to a liquid processing treatment; on reel 3 no processing liquid is applied to the thread, but liquid previously applied thereto is allowed to drip therefrom; while on reel 4 the thread is dried. Reel 4 is shown as enclosed in a suitable housing 5 provided with a closure. Reel 4 is supplied with heating medium circulated through its drive shaft 6.

In the case of viscose artificial silk thread, for instance, the thread may be stored on several thread-advancing reels in a series, being subjected in sequence to desulphurizing, washing, bleaching, and, if desired, to other liquid processing treatments, before being dried. The illustrated apparatus is generally similar to that shown in prior application Serial No. 7,114, in that the apparatus as a whole comprises a plurality of adjacent downwardly extending series of thread-advancing reels each of which series serves to process a single thread. Corresponding reels of adjacent series are disposed in corresponding positions lengthwise of the machine as a whole whereby certain advantages are provided in arranging the processing liquid supply and collecting equipment as well as in other features of the apparatus.

The reels shown are of cantilever form; that is, each is supported and driven from one end only in such manner that the other end is unsupported and unobstructed. Each advances the thread toward the unsupported end of the reel in a plurality of generally helical turns. Numerous benefits are provided by the cantilever construction of the reel, among them the advantages of easy access to the reel for starting the thread thereon, ease of transferring the thread to the succeeding reel, etc. Moreover, cantilever construction of the reels makes it possible to dispose them as shown in Figure 1 in stepped arrangement with the discharge end of each reel in apposite relation to the receiving end of the succeeding reel, the unsupported ends of all reels extending in the same direction.

In the illustrated apparatus, processing liquid is supplied to the thread on each liquid processing reel from a tube 7 which communicates with a conduit 8 extending lengthwise of the machine serving corresponding reels in a number of downwardly extending series. The processing liquid thus applied to the thread on each reel, particularly when the reels are inclined somewhat from the horizontal, may during rotation of the reel be caused to form a film of processing liquid which extends completely around and over the thread winding thereon, the liquid in said film traveling toward the supported end of the reel. The liquid applied to the thread on the reel drops off into collecting trough 9, from which it is passed to the sewer or, if desired, recirculated.

In the illustrated embodiment of the invention, the trough 9 below each horizontal series of reels is molded of hard rubber, Bakelite, or other suitable resin. Formed integrally with it is a conduit 8 by means of which processing liquid is supplied to the succeeding reel; i. e., the reel below the trough. Moreover, each trough 9 is formed with recesses 11 below the discharge ends of the reels with which it is associated through which recesses the threads 1 can pass to the succeeding reels. Associated with each recess is a guide 12 mounted on the front face of the trough to aid in guiding the thread to the succeeding reel.

The reels may be supported in any desired manner but are preferably supported from an inclined frame member 13. Each of the liquid processing reels in each downwardly extending series is driven from an upwardly extending drive shaft 14 extending parallel to said inclined frame member, preferably by means of a gear 15 mounted on drive shaft 14 meshing with a gear 16 mounted on reel drive shaft 17. Reel 4 is similarly driven from inclined drive shaft 14 by means of a gear 18 mounted on said drive shaft meshing with a gear 19 mounted on drive shaft 6 of reel 4. Each inclined drive shaft 14 may be rotatably supported from the frame of the apparatus by bearings 20.

In the illustrated embodiment of the invention, the inclined drive shafts 14 for adjacent downwardly extending series are rotated from a main drive shaft 21 extending longitudinally of the machine, a gear 22 on each inclined drive shaft 14 meshing with one of the gears 23 mounted on said main drive shaft. A positive engagement clutch; viz., a jaw clutch 24, is provided to disconnect each downwardly extending series of reels from the main drive shaft 21. Thus in the apparatus shown each gear 23 is rotatably mounted on said main drive shaft 21, bearing against a collar 25 on one side thereof. Each is provided on the other side thereof with a hub having clutch teeth 26. Clutch member 27, which is keyed to and slidably mounted on drive shaft 21, has teeth 28 adapted to engage teeth 26 on gear 23. A collar 32 mounted on said drive shaft is provided to limit the movement of the slidable clutch member 27 in its disengaged position.

Shifter fork 29, actuated by a handle 30 accessible from the operating face of the machine, is provided to control the clutch. By such means, a single series of reels can be disengaged from the main driving mechanism without interrupting the operation of the various other series of reels, of which a hundred or more may be embodied in a single machine. Yet such means serve to provide positive driving engagement, so that each series of reels rotates in timed relation with all other series. Consequently, it is possible to have all corresponding reels in all series rotate at the same speed and thus to subject all threads to identical processing treatments.

The improved reel illustrated in Figures 3 to 9, inclusive, comprises two rigid reel members 33 and 34, each having its periphery formed of a plurality of spaced, longitudinally extending members. The bar members 35 of reel member 33 and the bar members 36 of reel member 34 are alternately disposed, the two reel members being mounted for rotation about independent axes. The axes of the two reel members are preferably disposed in inclined relation in parallel planes, the axes being in skew relation to each other. The axes may, of course, be in other relations to each other; e. g., inclined toward each other in one and the same plane.

In the illustrated embodiment of the invention, the spaced, longitudinally extending bar members 35 of reel member 33 are fixed to a generally cylindrical body portion 37, as a result of which construction a high degree of rigidity is obtained. Body portion 37 may be partially hollowed as shown, having a hub portion 38 by means of which reel member 33 is concentrically mounted on reel drive shaft 17, which is itself journalled in supporting member 39. Since reel member 33 is concentrically mounted on and driven by drive shaft 17, it may, if desired, accurately be described as the concentric or driving reel member.

Reel member 34, which may be termed the eccentric or driven reel member, has its bar members 36 formed as part of a rigid cagelike member 41.

In said cagelike member 41 the bar members 36 are rigidly fixed to an internal annular reinforcing rib 42 disposed at the unsupported end of the reel. At the other end, bar members 36 are fixed to an external annular rib 43 which not only imparts rigidity to the bar members but also serves as a means by which the cagelike member 41 may be mounted on rotatable supporting member 44. Cagelike member 41 is clamped on supporting member 44 by means of T-head bolts 45 which pass through said external annular rib 43 and are provided with nuts 46 in recesses at the back of said supporting member 44. The external rib 43 is so formed that it projects beyond the heads of the bolts 45 and thus serves as a means preventing thread from entangling about the rear of the reel.

A flexible seal 47 which may be made of soft rubber or other material resistant to the action of processing liquids, lubricants, etc., extends between the eccentric and concentric members. It encloses the internal bearing portions of the reel, which might be harmed if exposed to the processing liquids. The outer rim of the seal, which is preferably of the cup-shaped form shown, is clamped between the front face of an annular flange portion 48 on supporting member 44 and the shoulders 49 on bar members 36. It may be provided with one or more annular ridges, as shown, to aid in providing an impervious joint, a suitable annular washer 51 being provided between the rim of the seal 47 and the shoulders 49 to equalize the pressure on the sealing means. The other end of the seal 47 is preferably mounted on hub portion 38 of the concentric member, a suitable spring ring 52 being provided to clamp it in place.

The flexible seal 47 may be mounted between the concentric and eccentric reel members 33 and 34 in somewhat twisted condition, so that, due to its resiliency, the bar members 36 of eccentric reel member 34 are held to as great an extent as possible against the bar members 35 of the concentric reel member 33; by such an arrangement, the possibilities of detrimental impact between the reel members on rapid starting or stopping the reel is greatly reduced.

In this embodiment of the invention, the supporting member 44 forming part of the eccentric reel member is provided with a longitudinally extending hub portion 53 having a bore therethrough surrounding the supporting member 39 which supports the reel. The supporting member 39 is provided with a longitudinally projecting hub portion 54 accommodating the inner races of antifriction bearings 55 and 56. The latter are disposed for rotation about a common axis which is offset from and inclined in the desired relation to the axis of drive shaft 17.

The external surface of said projecting portion 54 may be of substantially cylindrical form and may, as shown, be provided with raised portions ground to fit the inner races of the bearings 55 and 56, which may be passed over the free end of reel supporting member 39 in assembly. The outer races of said spaced antifriction bearings 55 and 56 are concentrically mounted in recesses in the ends of supporting member 44 for the eccentric reel member, thus locating said eccentric reel member between them. The rear antifriction bearing 56 is located against a shoulder 57 on supporting member 39 while a collar 58 fixed to the unsupported end of said frame member, as by a set screw, locates the front bearing 55. Thus the eccentric member 34 is accurately located lengthwise of supporting member 39.

In this embodiment of the invention, the reel drive shaft 17 is journalled in said supporting member 39 by antifriction bearing 59 at the rear of said supporting member and by a bearing 60 at the front end of said supporting member. Suitable collars 62 and 63 mounted on said drive shaft, as by means of set screws, accurately locate said drive shaft 17 endwise with respect to the supporting member 39. Antifriction bearing 59, like the other antifriction bearings, may be of the self-lubricated type, and bearing 60 may be made of the lubricant-impregnated type. Moreover, the antifriction bearings may be sealed, as shown, against the entrance of foreign material and against the escape of lubricant.

The principle of operation of reels of the type illustrated is explained in prior application Serial No. 652,089.

Briefly, in the operation of the reel shown in Figures 3 to 5, inclusive, rotation of the reel drive shaft 17 causes concentric member 33 to rotate, whereupon contact of the bar members 35 of concentric reel member 33 with bar members 36 of eccentric reel member 34 causes said eccentric reel member to rotate at the same angular speed. The concentric reel member thus serves as the driving reel member while the eccentric reel member constitutes the driven reel member. During such rotation, the offset relation of the reel members causes the thread to be transferred from the bar members of one reel member to those of the other reel member.

Simultaneously, the inclined relation of the reel members causes the thread turns carried by the reel members to travel lengthwise of the reel, so that the thread is advanced in a plurality of generally helical turns longitudinally of the reel. The amount that each thread turn advances during each revolution of the reel for a reel member of a given diameter is determined by the angle of inclination between the axes of the reel members. In the reel of Figures 3 to 9, inclusive, for the direction of rotation indicated in Figure 4, the thread will advance toward the unsupported end of the reel, which is desirable because of the advantages which arise from the operation of a cantilever reel in this manner.

Preferably, each of the reels is demountably positioned on the frame of the apparatus.

To that end, the supporting member 39 is provided with a circular flange portion 64 which is larger in diameter than that of the drive gear 16 mounted on the reel drive shaft 17. Said flange portion closely fits into a recess in the cup 65 fixed, as by a welding operation, to the frame of the machine. The edges of the flange portion on said supporting member for the reel, which edges are accurately finished, fit closely against accurately finished surfaces in said cup. As shown in Figure 5, the flange portion is held in the cup by means of set screws 66 threaded into lugs 67 forming part of the cups, the set screws being provided with frusto-conical ends which bear against the side of the flange opposite that which is seated in the cup. Tightening of the set screws thus firmly holds the flange portion 64, and consequently the reel, in position.

As shown in Figure 3, the rear end of the reel extends through an opening in the back portion of the trough 9. A cuplike member 68 may be mounted in said opening with its side walls surrounding a flange 69 mounted on the hub of the reel. Such cuplike member 68 and flange 69 in effect form a labyrinth seal. Cooperation of said cuplike member 68 and said flange 69, which may be made of rubber or other material suitably resistant to the reagents employed, prevents the processing liquid from reaching the elements at the rear of the reel.

In the embodiment of Figures 3 to 9, inclusive, the eccentric member 33 is mounted on reel drive shaft 17 by means permitting relative rotation between them in case the torque becomes greater than a predetermined amount. In the embodiment of these figures, such means takes the form of a slip clutch, indicated generally at 71, comprising a metallic insert 72 which is of hexagonal shape fitting closely in a correspondingly shaped recess in the hub of concentric reel member 33. Said insert is held in place as shown in Figures 6, 7 and 8 by means of a snap ring 73 disposed between the inner inclined wall 74 of a circular recess formed in the hub of concentric member 33 and flats 75 on the corners of the hexagonal shaped insert 72. The position of snap ring 73 is indicated in dotted lines in Figure 7.

Insert 72 is provided with diametrically disposed holes 76 into which, during driving engagement, balls 77 are forced by spring 79 disposed between said balls in a diametric hole 78 in drive shaft 17. If the torque differential as between the drive shaft 17 and reel member 33 is less than a predetermined amount, the balls seated in said holes 76 in insert 72 cause reel member 33 to rotate in unison with drive shaft 17. When, however, a torque differential occurs as between drive shaft 17 and reel member 33 which torque differential is of a magnitude greater than can be handled by the slip clutch 71, the balls 77 are forced inward toward each other, moving out of the holes 76 to permit relative rotation between the drive shaft 17 and concentric member 33.

Figures 6 and 7 represent conditions when the reel is rotating normally; Figures 8 and 9, when slipping occurs between the reel member and shaft 17. As long as the torque differential is greater than an amount determined by the dimensions of the parts and the strength of the spring between the balls, relative rotation between the reel members 33 and shaft 17 takes place. When the torque differential becomes equal to or less than said predetermined amount, the balls 77 seat in holes 76 and the reel member 33 and shaft 17 rotate in driving engagement.

In the illustrated embodiment of the invention, the metallic insert 72, which, like the balls 77, is formed of wear-resistant metal, is provided with an internal annular race 81, shown in Figures 7, 8 and 9, in which the balls 77 move when not seated in holes 76. Thus at all times, both when the balls 77 are seated in holes 76 and when slipping is taking place between drive shaft 17 and concentric member 33, the balls locate the concentric reel member 33 endwise of the drive shaft 17. Consequently, clutch means 71 not only permits relative rotation between the drive shaft 17 and concentric member 33 in the event of the development of a torque differential greater than a predetermined amount, but also serves as a means for locating concentric member 33.

Accordingly, no nut or other retaining means is required at the end of the drive shaft 17 to hold the concentric reel member on the drive shaft. Rather, the end of said concentric member can be sealed by means of a suitable cap 82 and thus the entrance of processing liquid into the interior of the reel prevented. In the illustrated reel, moreover, the concentric reel member 33, which may be formed of Bakelite, hard rubber, synthetic resin, or other material resistant to the action of the processing reagents, is provided with metallic bearing inserts 83 pressed therein to reduce wear.

The embodiment of the invention shown in Figure 10 is generally similar to that described above; however, the means providing relative rotation between the reel and driving means are associated with the driving gear 16a on reel drive shaft 17.

The driving gear 16a is rotatably mounted as shown on a sleeve 84 rigidly fixed to the drive shaft 17 of the reel. Said drive gear 16a is provided with one or more holes 85 therethrough, two in the embodiment shown, in each of which are disposed balls 86 forced apart by a spring 87. Sleeve 84 is provided with a shoulder 88 against which gear 16a bears and a retaining collar 89 on the other side of gear 16a. Said collar 89 has threaded therethrough a set screw 91 locking it against said sleeve 84 and another set screw 92 threaded through said collar passes through an opening through said sleeve 84 to lock the entire assembly on drive shaft 17 as shown in Figure 10. Shoulder 88 and collar 89 are provided with detents 93, at least one for each ball, in which said balls 86 seat during driving engagement.

When said balls are seated in detents 93, the normal driving action takes place from inclined shaft 14 through gears 15 and 16a to reel drive shaft 17. Concentric member 33 is mounted on said drive shaft for rotation therewith, being held against collar 62 by cap nut 94 threaded onto the end of said drive shaft. A pin 95 passing through said drive shaft extending into recessed slot 96 in the hub of concentric member 33 provides positive driving engagement. In the event the torque differential becomes greater than an amount determined by the proportions of the parts and by the strength of springs 87, the balls are compressed against the springs and rotation of gear 16a with respect to the reel drive shaft is permitted.

In the embodiment of Figure 11, the means providing slippage between the driving means and the reel in the event of an increase of torque beyond the predetermined amount is associated with the driving gear 15a mounted on inclined drive shaft 14.

Gear 16 is rigidly mounted on reel drive shaft 17 and the concentric member of the reel is connected to said drive shaft 17 as shown in Figure 10. The device providing slippage may, as shown, be generally similar to that associated with the reel gear 16a in Figure 10, wherefore no detailed description thereof is necessary. During normal operation, inclined drive shaft 14 rotates sleeve 84 and collar 89 mounted on said sleeve. The balls 86 disposed in holes 85 in gear 15a are forced by springs 87 into detents 93 in shoulder 88 and collar 89 on sleeve 84. Consequently, the gear 15a rotates in unison with shaft 14, thus rotating the reel. In the event, however, that the torque differential becomes greater than the predetermined amount, gear 15a is permitted to slip with respect to inclined drive shaft 14.

In the embodiment of Figures 12 and 13, the reel is similar to that shown in Figures 3 to 5, inclusive, except that the means for driving the concentric member 33 are different. In the modification of Figures 12 and 13, flexible fingers 97 fixed at one end thereof to a flange on a collar 98 fixed by set screw 99 to the drive shaft 17 engage grooves or notches 101 in metallic insert 102 fixed to the concentric reel member. As in the device of Figure 3, insert 102 is of hexagonal shape and fits in a corresponding recess in concentric member 33, being held therein by a snap ring 103 in a manner similar to that above described in connection with the embodiment shown in Figures 7 to 9, inclusive.

Said fingers 97, which extend longitudinally of the drive shaft, engage the corresponding grooves or notches 101 in said insert 102 during normal driving engagement, as shown in Figure 13, thus rotating the concentric member 33 in unison with reel drive shaft 17. When the torque differential between the drive shaft and concentric member 33 becomes greater than a predetermined amount, the fingers flex and move out of the notches 101, thus permitting relative movement between concentric member 33 and drive shaft 17. An intermediate position of the fingers is shown in the broken lines in Figure 13.

In this embodiment of the invention, the concentric member 33 is held on drive shaft 17 by means of washer 104 and nut 105. The whole is sealed off by means of a cap 82 which serves to prevent the entrance of processing liquids. In this embodiment, as in the embodiments of Figures 3 to 9, inclusive, the slip clutch mechanism is contained within the flexible seal 47, being thereby protected from the processing liquids. The sealing means also operates to prevent the escape of lubricant from the bearings.

In the embodiment of Figure 14, the slip clutch mechanism operates on a principle similar to that of the embodiment of the invention shown in Figures 12 and 13. In this embodiment, however, the flexible fingers 97a are rigidly mounted in an insert 102a which is held in concentric member 33 by snap ring 103a. The fingers 97a engage grooves 101a in a shoulder formed on collar 98a. During normal operation, the ends of the fingers engage said grooves 101a and the concentric reel member 34, is rotated from collar 98a rigidly fixed to reel drive shaft 17. When the torque differential becomes greater than the predetermined amount, the fingers 97a move out of grooves 101a, thus permitting relative rotation between reel member 33 and drive shaft 17, substantially as described above.

The reels illustrated as embodying the invention are designed so that they are not affected by the reagents employed to process the thread. Thus the parts sectioned in heavy lines may be made of materials such as hard rubber, Bakelite, synthetic resins or other materials resistant to the reagents employed. In each reel, a flexible sealing means is disposed between the two reel members to protect the interior metallic parts of the reel, while the ends of the drive shaft are protected either by being enclosed within nuts made of such material or by being enclosed within the concentric reel member.

Each pair of gears employed for driving each reel is preferably made of materials having the requisite wearing qualities. In the embodiments of the invention illustrated, one of the gears 15 and 16 or 15a and 16a, as the case may be, is preferably formed of metal such as steel, while the other is preferably formed of fabric-reinforced Bakelite or the like. Thereby is obtained a combination which has good wearing qualities and which will operate for long periods of time with little or no lubrication or other attention.

From the above it is apparent that the present invention provides thread-advancing reels which, because they embody suitable slip clutch means, are not subject to breakage upon rapid starting or stopping or upon jamming of the reels even though the driven reel member, or both reel members, are mounted on low friction bearings. The present invention thus provides reels which permit restrained relative rotation, in the event of an increase in torque beyond a predetermined amount, between at least one reel member and its supporting means, wherefore a braking action is obtained. The reels of the present invention provide additional safety features for the benefit of the operators. They may readily be individually halted for cleaning or inspection without halting the other reels. They can be constructed at low cost. They are efficient in both construction and operation. They can operate for long periods of time with little or no attention or maintenance.

The illustrated embodiments of the invention are, however, purely illustrative. Various modifications may be made therein without departing from the spirit of the invention. For example, whereas in certain of these embodiments of the invention the concentric member is driven from the drive shaft by suitable slip clutch means, it is apparent that instead the eccentric member might be so driven. The invention is not restricted to devices of the particular type shown nor to devices for the use described, but may be applied to various other types of devices for a wide variety of uses.

It is intended that the patent shall cover, by suitable expression in the appended claims, whatever features of patentable novelty reside in the invention.

What is claimed is:

1. Apparatus comprising a thread-advancing thread store device which, during rotation thereof, advances thread or the like lengthwise thereof in a plurality of generally helical turns; means for driving said thread store device; and means connecting said thread store device and said driving means, said connecting means permitting slippage between said thread store device and said driving means.

2. A thread-advancing thread store device which, during rotation thereof, advances thread or the like lengthwise thereof in a plurality of generally helical turns and which comprises a rotatable thread-advancing element; a shaft on which said thread-advancing element is mounted; means for rotating said shaft; and, associated with said shaft, means responsive to a torque differential between said thread-advancing element and said shaft-rotating means permitting slippage between said thread-advancing element and said shaft-rotating means.

3. Apparatus comprising a thread-advancing thread store device which, during rotation thereof, advances thread or the like lengthwise thereof in a plurality of generally helical turns; means for supporting said thread store device; and means connecting said thread-advancing thread store device to said supporting means permitting restrained relative rotation between said thread store device and said supporting means.

4. A thread-advancing thread store device which, during rotation thereof, advances thread or the like lengthwise thereof in a plurality of generally helical turns and which comprises a thread-advancing element; a member on which said thread-advancing element is mounted; and means connecting said thread-advancing element and said mounting member permitting restrained relative rotation between said thread-advancing element and said mounting member.

5. Reel mechanism comprising a first reel member embodying a plurality of spaced, longitudinally extending bar members; a second reel member embodying a plurality of spaced, longitudinally extending bar members, the bar members of said second reel member being interleaved with those of said first reel member; means for driving one of said reel members; and means connecting said reel member and said driving means, said connecting means permitting slippage when a predetermined torque differential occurs as between said reel member and said driving means.

6. Reel mechanism comprising a driving reel member embodying a plurality of spaced, longitudinally extending bar members; a driven reel member comprising a plurality of spaced, longitudinally extending bar members, the bar members of said driven reel member being interleaved with those of said driving reel member; means for rotating said driving reel member; and means connecting said driving reel member and said rotating means, said connecting means permitting slippage when a predetermined torque differential occurs as between said driving reel member and said driving means.

7. Reel mechanism comprising supporting means; a first reel member rotatably carried by said supporting means embodying a plurality of spaced, longitudinally extending bar members; driving means for rotating said first reel member; a second reel member freely rotatably supported by antifriction bearing means carried by said supporting means, the bar members of said second reel member being alternately disposed to those of said first reel member; and means connecting said first reel member and said driving means, said connecting means permitting slippage when a predetermined torque differential occurs as between said reel member and said driving means.

8. Apparatus comprising a thread-advancing thread store device which, during rotation thereof, advances thread or the like lengthwise thereof in a plurality of generally helical turns, said thread store device including a rotatable thread-advancing element; means for driving said thread-advancing element; and means connecting said thread-advancing element and said driving means permitting slippage when a predetermined torque differential occurs as between said thread-advancing element and said driving means, said connecting means locating said thread-advancing element axially of said driving means.

9. Apparatus comprising a thread-advancing thread store device which, during rotation thereof, advances thread or the like lengthwise thereof in a plurality of generally helical turns, said thread store device including a rotatable thread-advancing element; a drive shaft on which said thread-advancing element is mounted; means for rotating said shaft; and means connecting said thread-advancing element and said drive shaft permitting relative rotation between said thread-advancing element and said drive shaft in the event a predetermined torque differential occurs as between said drive shaft and said thread-advancing element, said connecting means locating said thread-advancing element lengthwise of said drive shaft.

10. Reel mechanism comprising a first reel member embodying a plurality of spaced longitudinally extending bar members; a second reel member embodying a plurality of spaced, longitudinally extending bar members, the bar members of each of said reel members being interleaved with those of the other reel member; driving means for rotating one of said reel members; and means connecting said reel member and said driving means for rotation therewith permitting slippage in the event a predetermined torque differential occurs as between said driving means and said reel member, said connecting means locating said reel member axially of said driving member.

11. Reel mechanism comprising a first reel member embodying a plurality of spaced, longitudinally extending bar members; a second reel member embodying a plurality of spaced, longitudinally extending bar members, the bar members of each of said reel members being interleaved with those of the other reel member; means from which said reel members are rotatably supported; a drive shaft rotatably carried by said supporting means; means for positively rotating said drive shaft; and means connecting one of said reel members and said drive shaft permitting relative rotation between said reel member and said drive shaft in the event a predetermined torque differential occurs as between said drive shaft and said reel member, said connecting means locating said reel member lengthwise of said drive shaft.

12. Reel mechanism comprising supporting means; a first reel member rotatably carried by said supporting means embodying a plurality of spaced, longitudinally extending bar members; means for positively driving said first reel member; a second reel member embodying a plurality of spaced, longitudinally extending bar members freely rotatably carried by antifriction bearings carried by said supporting means, the bar members of said second reel member being interleaved with those of said first reel member; and means connecting said first reel member and said driving means permitting slippage in the event a predetermined torque differential occurs as between said driving means and said reel member, said connecting means locating said reel member axially of said supporting means.

13. Reel mechanism comprising a first reel member embodying a plurality of spaced, longitudinally extending bar members; a second reel member embodying a plurality of spaced, longitudinally extending bar members, the bar members of each of said reel members being interleaved with those of the other reel member; a driving member for rotating one of said reel members; and means connecting said reel member and said driving member permitting slippage therebetween when a predetermined torque differential occurs as between said reel member and said driving member, said connecting means comprising means carried by one of said members resiliently engaging said other member.

14. Reel mechanism comprising a first reel member embodying a plurality of spaced, longitudinally extending bar members; a second reel member embodying a plurality of spaced, longitudinally extending bar members, the bar members of each of said reel members being interleaved with those of the other reel member; a driving member for rotating one of said reel members; and means connecting said reel member and said driving member permitting slippage therebetween when a predetermined torque differential occurs as between said reel member and said driving member, said connecting means comprising at least one member resiliently mounted on said driving member and a detent on said reel member adapted to engage said resiliently mounted member.

15. Reel mechanism comprising a first reel member embodying a plurality of spaced, longitudinally extending bar members; a second reel member embodying a plurality of spaced, longitudinally extending bar members, the bar members of each of said reel members being interleaved with those of the other reel member; a driving member for rotating one of said reel members; and means connecting said reel member and said driving member permitting slippage therebetween when a predetermined torque differential occurs as between said reel member and said driving member, said connecting means comprising at least one member resiliently mounted on said reel member and a detent on said driving member adapted to be engaged by said resiliently mounted member.

16. Reel mechanism comprising a first reel member embodying a plurality of spaced, longitudinally extending bar members; a second reel member embodying a plurality of spaced, longitudinally extending bar members, the bar members of each of said reel members being interleaved with those of the other reel member; means from which said reel members are rotatably supported; a drive shaft rotatably carried by said supporting means; means for positively rotating said drive shaft; and means connecting one of said reel members for rotation with said drive shaft permitting relative rotation therebetween when a predetermined torque differential occurs as between said reel member and said drive shaft, said connecting means comprising at least one resilient member mounted on said drive shaft and means associated with said reel member adapted to engage said resilient member during normal operation but adapted to be overridden by said resilient member when such torque differential occurs as between said drive shaft and said reel member.

17. Reel mechanism comprising a first reel member embodying a plurality of spaced, longitudinally extending bar members; a second reel member embodying a plurality of spaced, longitudinally extending bar members, the bar members of each of said reel members being interleaved with those of the other reel members; means from which said reel members are rotatably supported; a drive shaft rotatably carried by said supporting means; means for positively rotating said drive shaft; and means connecting one of said reel members for rotation with said drive shaft permitting relative rotation therebetween when a predetermined torque differential occurs as between said reel member and said drive shaft, said connecting means comprising at least one resilient member rotatably mounted on said reel member, and means associated with said drive shaft adapted to be overridden by said resilient member when such torque differential occurs as between said reel member and said drive shaft.

18. Reel mechanism comprising a supporting member; a reel member embodying a plurality of spaced, longitudinally extending bar members rotatably mounted on said supporting member; a rotatable drive shaft journalled in said supporting member adapted to rotate simultaneously with said first reel member; a second reel member comprising a plurality of spaced, longitudinally extending bar members rotatably mounted on said drive shaft, the bar members of said second reel member being interleaved with those of said first reel member; and means for connecting said second reel member to said drive shaft permitting relative rotation therebetween in the event a predetermined torque differential occurs as between the two comprising at least one ball carried by said drive shaft, resilient means urging said ball away from said drive shaft, and a detent on said reel member engaged by said ball during normal operation adapted to be overridden by said ball when such torque differential occurs as between said reel member and said drive shaft.

19. Reel mechanism comprising a supporting member; a reel member embodying a plurality of spaced, longitudinally extending bar members rotatably mounted on said supporting member; a rotatable drive shaft journalled in said supporting member adapted to rotate simultaneously with said first reel member; a second reel member comprising a plurality of spaced, longitudinally extending bar members rotatably mounted on said drive shaft, the bar members of said second reel member being interleaved with those of said first reel member; and means for connecting said second reel member to said drive shaft permitting relative rotation therebetween in the event a predetermined torque differential occurs as between the two comprising at least one ball disposed in a radial hole in said drive shaft, spring means urging said ball out of said hole in said drive shaft, a portion associated with said reel member surrounding said drive shaft and said ball and provided with an internal annular race in which said ball is seated during relative rotation of said drive shaft with respect to said reel member and at least one detent in said race in which said ball is seated when said reel member is rotating with said drive shaft during normal operation of said reel mechanism.

20. Apparatus of the character described in claim 19 in which the portion associated with said reel member is of polygonal shape, fits closely into a correspondingly shaped recess in said reel member, and is held in said reel member by means of a snap ring.

21. A thread-advancing thread store device comprising two rotatable thread-advancing members which, during rotation thereof, cooperate to advance in a plurality of generally helical turns thread or the like wound about said thread-advancing members; means for rotating one of said thread-advancing members, the other of said thread-advancing members being mounted for rotation with and by said first-mentioned thread-advancing member; and means connecting said first-mentioned thread-advancing member and said driving means, said connecting means permitting slippage when a predetermined torque differential occurs as between said first-mentioned thread-advancing member and said driving means.

22. A thread-advancing thread store device comprising two rotatable thread-advancing members which, during rotation thereof, cooperate to advance in a plurality of generally helical turns thread or the like wound about said thread-advancing members; a shaft on which one of said thread-advancing members is mounted, the other of said thread-advancing members being mounted independently for rotation with and by said first-mentioned thread-advancing member; means for rotating said shaft; and, associated with said shaft, means for imparting rotatory movement from said driving means to said first-mentioned thread-advancing member, the means for imparting such rotatory movement being responsive to a predetermined torque differential between said first-mentioned thread-advancing member and said shaft-rotating means to permit slippage therebetween.

GEORGE P. TORRENCE.
RICHARD F. BERGMANN.
CLARENCE C. WALTERS.